United States Patent [19]

Judkins

[11] Patent Number: 4,461,330
[45] Date of Patent: Jul. 24, 1984

[54] PORTABLE WOODWORKING POWER TOOL

[76] Inventor: Donald J. Judkins, 537 Barcelona Dr., Millbrae, Calif. 94030

[21] Appl. No.: 405,663

[22] Filed: Aug. 6, 1982

[51] Int. Cl.³ .............................................. B27C 5/10
[52] U.S. Cl. .............................. 144/134 D; 51/50 PC; 51/101 R; 144/371; 279/53; 409/182; 409/211
[58] Field of Search ........................ 51/101 R, 50 PC; 409/182, 211; 279/53; 144/134 R, 134 D, 136 C, 371

[56] References Cited

U.S. PATENT DOCUMENTS

| | | | |
|---|---|---|---|
| 2,943,654 | 7/1960 | Emmons | 144/136 C |
| 3,447,001 | 5/1969 | Zelik | 144/134 D |
| 3,454,061 | 7/1969 | Cordone et al. | 144/134 D |
| 3,494,394 | 2/1970 | Stock | 144/134 D |
| 3,587,387 | 6/1971 | Burrows | 409/182 |

FOREIGN PATENT DOCUMENTS 542165  4/1956  Italy ................................ 144/134 D Primary Examiner—W. D. Bray
Attorney, Agent, or Firm—John L. McGannon

[57] ABSTRACT

A woodworking power tool comprising a base plate having a motor mounted thereon at one end of the base plate. The motor has a motor housing on which a spindle housing is mounted for rotation through an arc of 180°. The spindle housing has a spindle therein and the spindle is adjustably mounted for up and down movement with referene to the bottom flat surface of the base plate. A toggle mechanism is carried by a handle grip on the base plate for adjustably locking the spindle housing in a fixed, rotative position on the motor housing. A shaft is rotatably mounted in the spindle and has a tool-actuated collet for releasably attaching the shank of a cutting tool to the shaft. A drive train connects the drive shaft of the motor with the shaft of the spindle to rotate the cutting tool on the end of the spindle shaft. Adjustment of the height of the spindle relative to the spindle housing permits the cutting tool to be placed above, flush with, or below the plane of the bottom surface of the base plate so that different types of cuts can be made in workpieces.

26 Claims, 8 Drawing Figures

PORTABLE WOODWORKING POWER TOOL

This invention relates to improvements in portable power tools and, more particularly, to a woodworking tool of the router type.

BACKGROUND OF THE INVENTION

Portable woodworking power tools of the router type have been used in the past for performing various cutting actions on workpieces. However, conventional portable power tools of this type are limited as to the shapes and locations of cuts that can be made in a workpiece. For instance, the conventional router cannot have the rotatable routing tool thereof mounted above the support surface over which the portable routing tool is moved. The operative positions of the routing tool are limited to the space about such a support surface. Bench mounted, radial arm routers are required for cutting above a support surface and such routers are oftentimes too expensive for the home hobby shop. A need therefore exists for an improved portable, motor driven power tool which will perform all of the ordinary functions of a conventional router and also perform the tasks previously accomplished only by the use of an overhead, radial arm router.

Representative U.S. patents in the field of portable power tools with routing tools include the following:

U.S. Pat. No. 3,035,845
U.S. Pat. No. 3,111,969
U.S. Pat. No. 3,207,193
U.S. Pat. No. 3,212,541
U.S. Pat. No. 3,443,479
U.S. Pat. No. 3,454,061
U.S. Pat. No. 3,487,747
U.S. Pat. No. 3,494,394
U.S. Pat. No. 3,494,395
U.S. Pat. No. 3,811,361
U.S. Pat. No. 3,487,046
U.S. Pat. No. 4,108,225.

SUMMARY OF THE INVENTION

The present invention fulfills the aforesaid need by providing a portable electric power tool which is suitable for use in the home hobby shop as well as the small woodworking shop, neither of which can afford the cost of a large, expensive, piece of machinery nor the impracticality of a power tool which is not portable. To this end, the present invention includes a portable power tool which has a base plate on which a motor in a motor housing is mounted. A hand grip is also carried on the base plate, and the base plate has a pair of opposed side faces for use as guides when the power tool is used.

A spindle housing is rotatably mounted on the motor housing for movement through a predetermined arc. A toggle mechanism carried by the support releasably locks the spindle housing in any one of a number of angular positions about the motor housing.

A spindle is adjustably mounted in the spindle housing for up and down movement with respect thereto. A shaft is rotatably mounted in the spindle and has a lower end provided with a collet for releasably securing the shaft of a cutting tool to the spindle. A drive train couples the shaft with the drive shaft of a motor so that when the motor is energized, a routing or other tool mounted in the collet of the spindle shaft is rotated to cut a workpiece in a routing action. Any rotatable tool can be coupled with the collet to perform a desired function.

The height of the spindle can be adjusted such that the cutting tool is spaced above, is flush with, or extends below the plane of the flat bottom surface of the base plate. In this way, a workpiece can be cut so that a recess formed in the workpiece can have its bottom spaced above, flush with, or spaced below a reference surface of the workpiece.

The primary object of the present invention is to provide an improved power tool for performing cutting and other functions on workpieces wherein the power tool has a spindle which is adjustable so that it can be raised and lowered to position a rotatable tool in such a way that the tool can perform the ordinary functions of a conventional router and also perform the tasks previously accomplished only by the use of an overhead, radial arm router.

Another object of the present invention is to provide a power tool of the type described which is simple and rugged in construction, is inexpensive to produce and maintain, and is easy to use even by persons of little or no skills.

Other objects of this invention will become apparent as the following specification progresses, reference being had to the accompanying drawings for an illustration of the invention.

Figure 1:
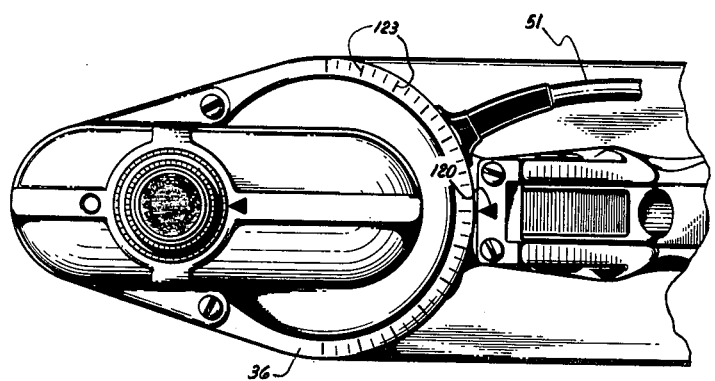
FIG. 1 is a fragmentary, top plan view of the power tool of the present invention.
Figure 2:
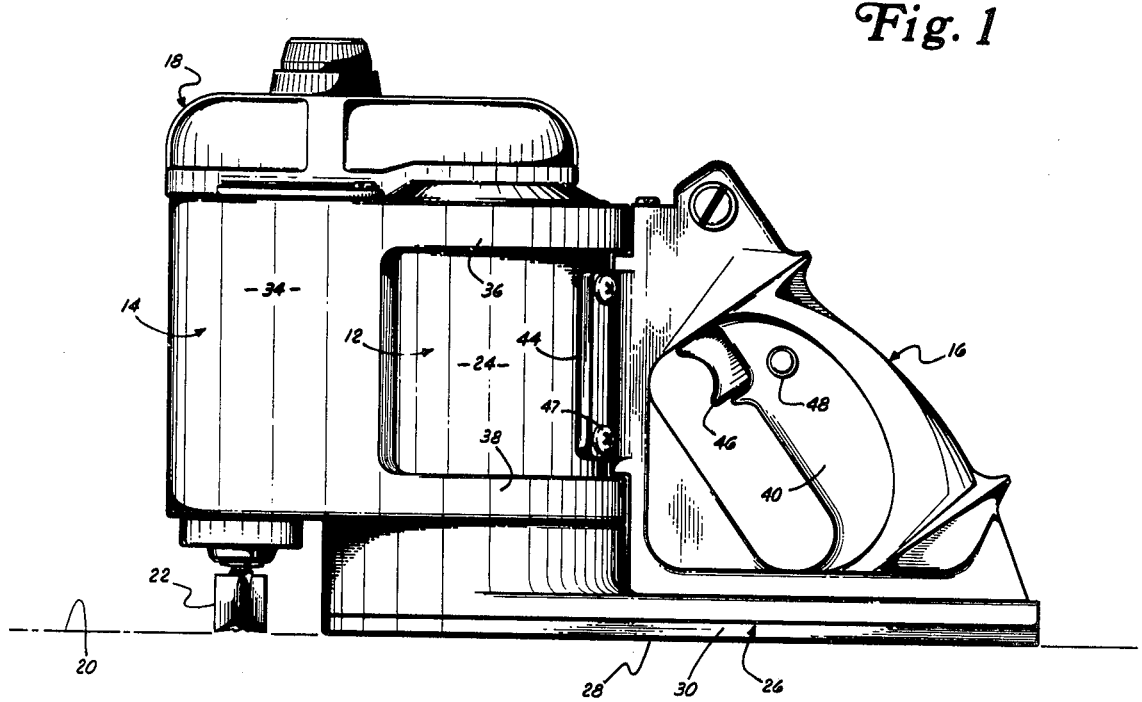
FIG. 2 is a side elevational view of the power tool showing a router type cutting tool on the spindle thereof, the cutting tool being above a support surface over which the power tool moves.

The portable, electric motor driven power tool of the present invention is broadly denoted by the numeral 10 and is shown in FIGS. 1 and 2 as being comprised of four basic parts. These parts are an electric motor 12, an offset cantilevered spindle housing 14, a handle assembly 16, and a removable cover 18 which overlies motor 12 and spindle housing 14. The power tool 10 is adapted to be manually held and to be moved over a work surface 20 so that the routing tool 22 carried by a rotatable shaft in spindle housing 14 can perform a routing action on a workpiece.

Figure 3:
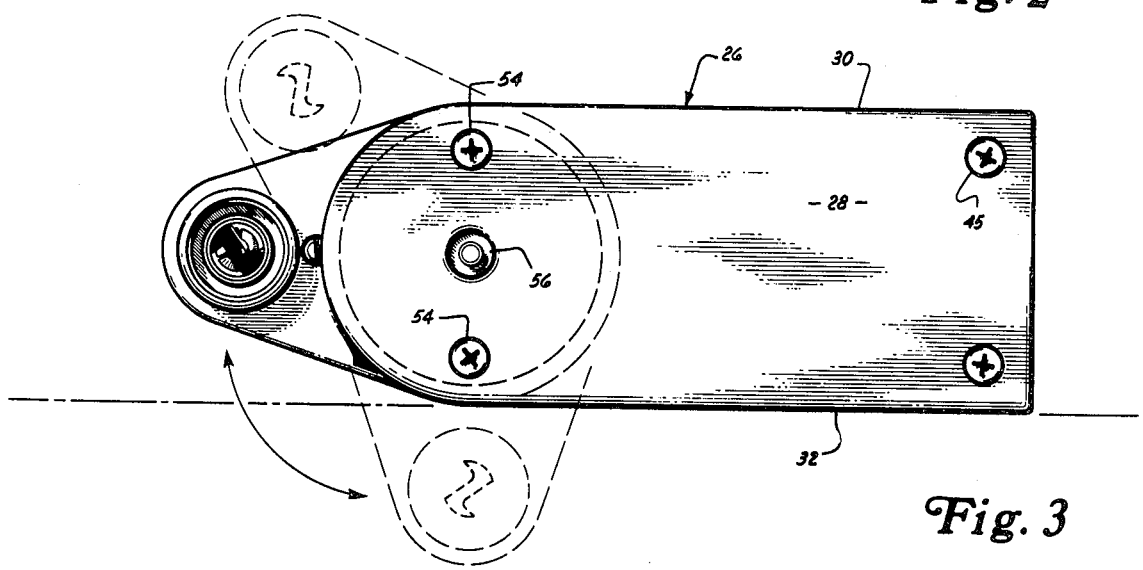
FIG. 3 is a bottom plan view of the power tool of FIGS. 1 and 2.

Motor 12 has a generally cylindrical outer housing 24 on a base plate 26 having a flat, lower surface 28 (FIGS. 2 and 3). Flat surface 28 engages and slides over surface 20 when power tool 10 is in use. Moreover, base 26 has a pair of generally parallel side faces 30 and 32 for use in guiding the power tool 10 along a straight path when one or the other the flat faces is held against a fence or a straight edge of the workpiece.

Spindle housing 14 is rotatably mounted on motor housing 24 for movement 90° in either direction from the central full-line position of FIGS. 1 and 3. FIG. 3 shows the spindle housing 14 in dashed lines when the spindle housing has been rotated in opposite directions from the central, full-line position of FIGS. 1 and 3.

Spindle housing 14 includes an outer, generally semi-cylindrical shell 34 projecting forwardly from motor housing 24, and a pair of vertically spaced rings 36 and 38 integral with shell 34 and partially surrounding motor housing 24. The handle assembly 16 has means hereinafter described for engaging the lower ring 38 for urging the latter against a portion of housing 24 so as to releasably secure spindle housing 14 in a fixed position relative to motor 12.

Figure 5:
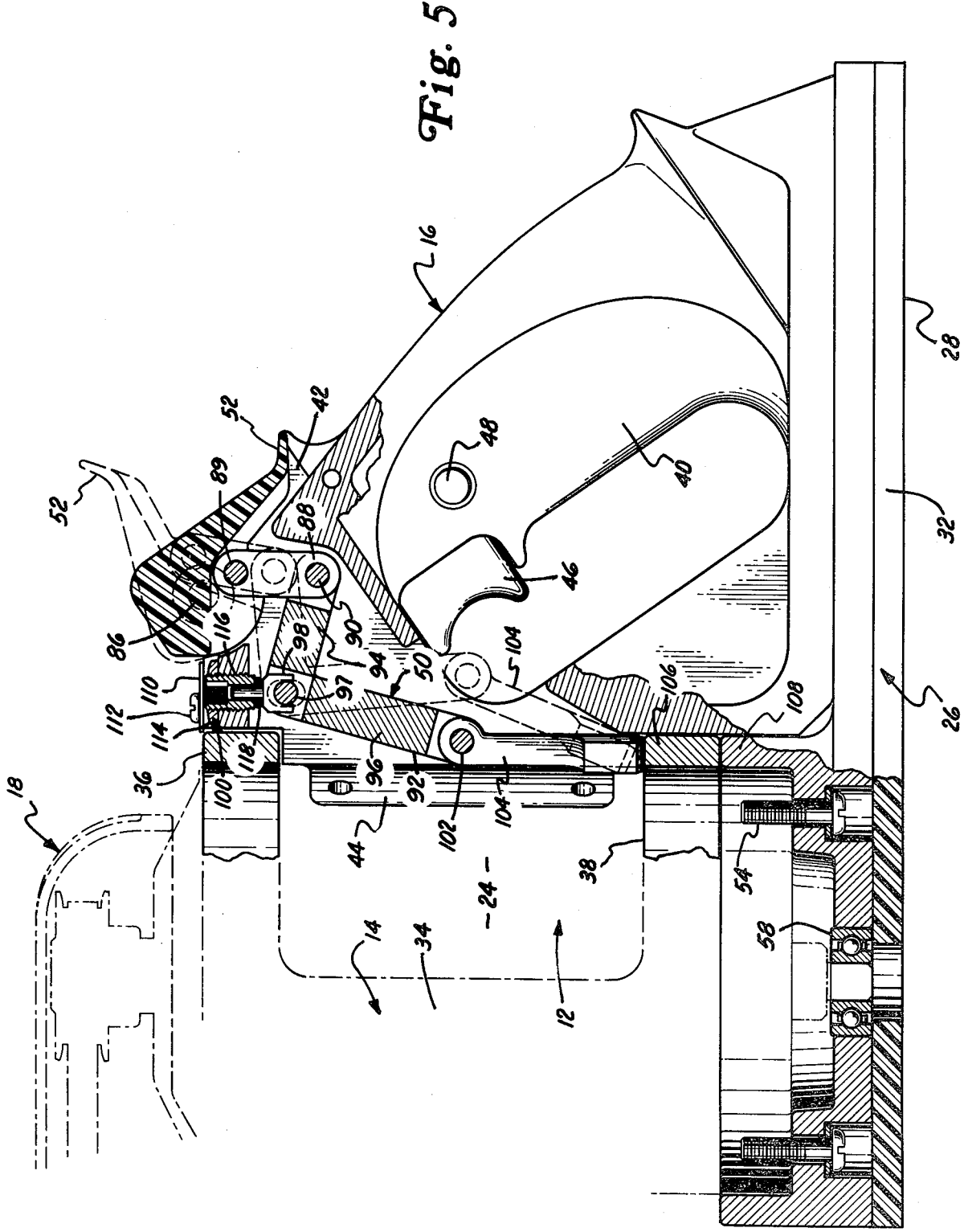
FIG. 5 is an enlarged, side elevational view of the handle of the power tool, parts being broken away and in section to illustrate the details of the handle and the way in which the spindle housing is releasably secured to the motor housing.

Handle assembly 16 includes a hand grip 40 which is inclined and extends upwardly from base 26 near the rear end of the base. Screws 45 (FIG. 3) secure the hand grip to the base. The upper portion 42 of hand grip 40 is secured by a plate 44 and screws 47 to the outer surface of motor housing 24 at a location between rings 36 and 38 as shown in FIGS. 2 and 5. Handle assembly 16 further includes a trigger switch push button 46 having a lock-on button 48 adjacent thereto. The switch operates the motor and a power cable 51 (FIG. 1) connects the motor to a source of electrical power. A toggle mechanism 50 (FIG. 5) is carried on the upper portion 42 of hand grip 40 and is operated by a lever 52 for releasably locking spindle housing 14 in an operative position on motor housing 24. This toggle mechanism will be described hereinafter.

Removable cover 18 serves several purposes. It provides a hand rest for one hand in guiding power tool 10 as the other hand grasps grip 40 and operates push button 46. Cover 18 further acts as a safety means to cover the interior working parts of spindle housing 14 so as to prevent accidents. The cover, when removed from the spindle housing 14, permits access to the drive train connecting the motor with the spindle in the spindle housing.

Motor housing 24 is secured by screws 54 (FIG. 3) to base plate 26. The motor has a rotatable drive shaft 56 provided with a lower end mounted in a bearing 58 (FIGS. 4 and 5) carried by the base plate for supporting the lower end of the drive shaft. The upper end 60 of the drive shaft (FIG. 4) has a grooved pulley 62 mounted thereon. This pulley transmits the rotation of the drive shaft 56 of motor 12 through a grooved drive belt 64 to a second, grooved pulley 66 which is attached to the upper end of a tubular, spindle driving shaft 68 (FIG. 4) in spindle housing 14. This causes the rotation of the spindle driving shaft 68 relative to spindle housing 14.

Spindle driving shaft 68 is telescopically received within a spindle driven shaft 70 (FIG. 4) which is rotatably carried by the inner races of a pair of vertically spaced ball bearings 72 and 74. Spindle driven shaft 70 has a pair of diametrically opposed, longitudinally extending slots 76 therethrough for receiving a pair of protruding pins 78 on spindle driving shaft 68. Thus, spindle driving shafts 68 and spindle driven shaft 70 rotate as a unit yet the spindle driven shaft can be moved up and down with reference to spindle drive shaft 68.

Figure 4:
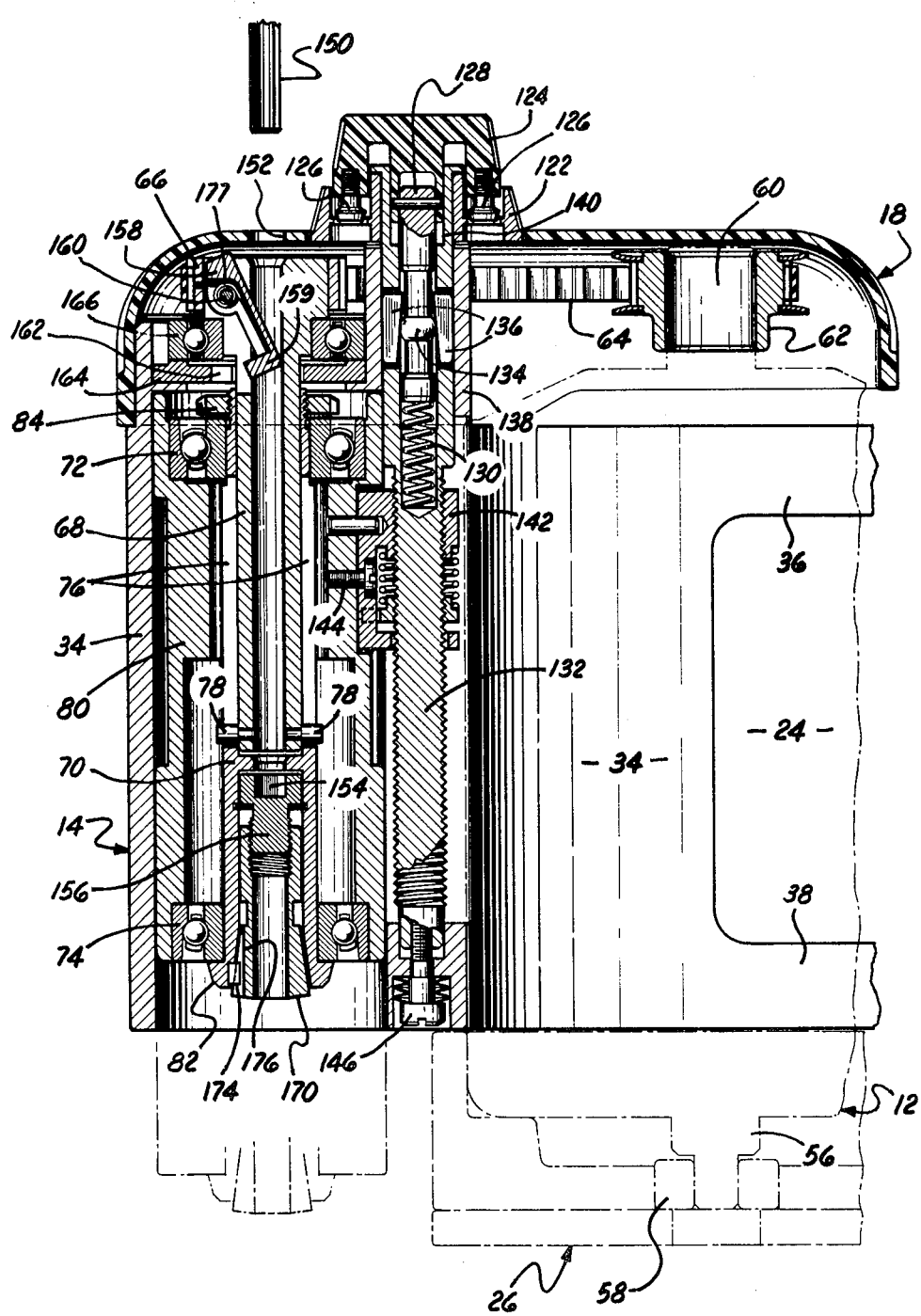
FIG. 4 is an enlarged, fragmentary, side elevational view, partially in section, showing the spindle housing and the way in which the motor of the power tool is coupled to the spindle in the spindle housing.

Bearings 72 and 74 have outer races carried by a spindle 80 slidably mounted within spindle housing 14 for up and down movement with respect thereto. Driven shaft 70 has a lower, annular shoulder 82 which bears against the lower surface of the inner race of lower bearing 74. The upper end of driven shaft 70 is externally threaded to receive a nut 84 which engages the upper, flat face of the inner race of upper bearing 72 as shown in FIG. 4, thereby releasably securing the driven shaft 70 to bearings 72 and 74. Upper bearing 72 is received within a recess at the upper end of spindle 80 as shown in FIG. 4.

Locking mechanism 50 for releasably locking spindle housing 14 in an operative position relative to motor housing 24 is shown in FIG. 5. When released, mechanism allows rotation of the spindle housing to a total angular displacement of 180°, 90° on each side of the central, full-line position shown in FIGS. 1 and 3. These limits are determined by the engagement of the spindle housing shell 34 with the upper part 42 (FIG. 5) of handle assembly 16.

Locking mechanism 50 includes a lever 52 which is pivotally mounted by means of a pin 86 (FIG. 5) on the upper portion 42 for movement from the full-line position of FIG. 5 to the dashed line position thereof. In the dashed line position of the lever, the spindle housing 14 is released from attachment to base 26 and allowed to be rotated about motor housing 24 into any operative position relative to the motor housing, such as either of the dashed line positions shown in FIG. 3. When the lever 52 is in full-line position of FIG. 5, the spindle housing is locked to base 26.

A link 88 is coupled by a throw pin 89 to lever 52, link 88 extending downwardly from pin 89 and being pivotally coupled by a second pin 90 to an L-shaped crank 92 which, at the junction of the legs 94 and 96 of the crank, a third pin 97 is supported by a saddle 98 adjustably mounted by mechanism 100 for up and down movement with respect to the handle assembly 16.

The lower end of crank 92 is pivotally coupled by a pin 102 to a rigid leg 104 whose lower end is adapted to bear against the upper surface 106 of the lower ring 38 of spindle housing 14. FIG. 5 illustrates the way in which leg 104 bears against upper face 106 so that downward pressure of leg 104 clamps ring 38 to the extended portion 108 of base 26. This clamping action prevents rotation of spindle housing 14 relative to base 26.

When it is desired to release the spindle housing from attachment to base 26, lever 52 is moved from the full line position thereof to the dashed line position, causing link 88, crank 92 and leg 104 to move into their dashed line positions shown in FIG. 5, thereby releasing the downward force on the lower ring 38 of spindle housing 14, thereby allowing the spindle to rotate freely within an angle of 180° relative to motor housing 24.

The clamping force exerted by mechanism 50 may be adjusted by removing an index plate 110 (FIG. 5) held in place by a screw 112, and then loosening the jam nut 114 and turning the pressure adjusting screw 116. This action transfers the screw pressure to a rubber ring 118 and to the saddle 98, which exerts downward pressure on pin 97. In this way, the clamping force of mechanism 50 can be increased or decreased. Index plate 110 is provided with an arrow 120 (FIG. 1) which can be aligned with index marks 123 on the upper ring 36 of spindle housing 14. Alignment of arrow 120 with one of the marks 123 represents a specific angular position of the spindle housing relative to the motor housing 24.

Spindle 80, in addition to being rotatable about the vertical rotational axis of drive shaft 56 of motor 12, can also be moved up and down within spindle housing 14 with reference to the work surface 20 over which power tool 10 moves. This up and down movement of the spindle 80 can be achieved by manipulation of a height adjusting knob 122 (FIG. 4) at the top of the spindle housing. By pressing downwardly on a locking knob 124 adjacent to adjusting knob 122, the head portions of a pair of lock screws 126 can enter a pair of key holes aligned therewith, the key holes being in a web in the inner portion of knob 122. The knob 124 is pressed downwardly until the heads of the lock screws 126 can be rotated so that the heads move into the space beneath the narrower sections of the key holes thereby holding knob 124 in a down or "unlocked" position.

When unlocking knob 124 is pressed downwardly, this causes a cam pin 128 to move downwardly, compressing a pressure locking spring 130 in the upper, open top bore of an externally threaded shaft 132. This causes the cam portion 134 of cam pin 128 to release the outward pressure previously transmitted to a pair of cam blocks 136 against the inner cylindrical wall surface of a tubular extension 138 forming a part of the spindle housing 14. When the locking pressure on the inner wall surface of extension 138 is released, the height adjusting knob 122 can now be rotated in either direction, to raise or lower the working height of spindle 80 in relation to the work surface 20 therebelow.

When cam blocks 136 have been radially inwardly moved after cam pin 128 has been shifted downwardly against the bias force of spring 130, rotation of knob 122 will cause rotation of an upper sleeve 140 which is part of the upper end of shaft 132, thereby allowing rotation of shaft 132 relative to tubular wall 138 of spindle housing 14. Rotation of shaft 132 causes a pre-load nut 142 to be shifted up and down. This pre-load nut is secured by a screw 144 to spindle 80, thereby causing spindle 80 to move up and down in spindle housing 14 in response to the rotation of shaft 132 relative to the spindle housing. The height of spindle 80 is adjusted to adjust the operating position of tool 22 relative to surface 20.

After the desired spindle height is obtained, the spindle can be locked by merely rotating the locking knob 124 in the opposite direction until the heads of screws 126 move out of the key holes in knob 122. Spindle 80 is then set and locked at the desired height and the preload nut 142 and a backlash take-up screw 146 (FIG. 4) assures that this setting will remain constant. The height adjusting knob 122 is graduated around its circumference with marking, such as four marks 90° apart. Each mark represents a vertical travel of, for instance, 1/64 inch of spindle 80, either upwardly or downwardly, relative to spindle housing 14.

To attach or remove a cutting tool 22 (FIG. 2) from the lower end of driven shaft 70, a collet wrench 150 (FIG. 4) is inserted into the access hole 152 in cover 18 (FIG. 4). The wrench is guided into and through the spindle drive shaft 68 and into a hexagonal hole 154 in the upper end of draw screw 156. As the wrench passes into and through the upper end of drive shaft 68, the wrench engages a shaft-locking cam member 158 pivotally mounted by a pin 160 to the upper end of drive shaft 68. When the wrench engages cam member 158, the cam member is rotated in a clockwise sense when viewing FIG. 4 until its gear-shaped lower portion 159 engages one of a number of internal splines 162 of a non-rotating splined washer 164 carried in any suitable manner on the lower surface of a ball bearing 166 whose inner race journals the upper end of drive shaft 68 with respect to spindle housing 14. With the shaft locking cam member 158 so engaged, spindle drive shaft 68 is prevented from rotating and remains locked as the wrench continues through the interior of the drive shaft 68 and into the hexagonal hole 154 of draw screw 156. Since the spindle driven shaft 70 is now prevented from rotating because drive shaft 68 cannot rotate, the draw screw 156, when turned, will either loosen or tighten the clamping force on the shank of the cutting tool 22, depending upon the direction of rotation of the wrench.

The tool clamping force on the tool shank is achieved by the action of a cone-shaped split collet 170 which is moveable into the conical lower opening of the spindle driven shaft 70. When this occurs, the split collet 170 is prevented from rotating by the engagement of a key 174 received in the adjacent keyway 176 of collet 170.

When the wrench is removed from the interior of drive shaft 68, cam member 158 is biased back into the full line position of FIG. 4 by a torsion spring 177, the torsion spring being carried by pivot pin 160. When this occurs, the spindle drive shaft 68 and spindle driven shaft 70 are unlocked and can be rotated by the energizing of motor 12. When the motor is energized, the centrifugal force keeps cam member 158 in the full-line position so as to be disengaged from splined washer 164.

In operation, power tool 10 is first adjusted to perform a certain cutting action with the cutting tool 22 on a particular type of workpiece. The cutting tool 22 is first selected, following which the shank of tool 22 is coupled, as described above, to collet 170 by the use of wrench 150. With cutting tool 22 attached to collet 170, the next adjustment is the height of spindle 80 relative to the bottom flat surface 28 of base 26. This is accomplished by the pressing downwardly on knob 124 and rotating it until screws 126 are secured in the key holes of knob 122; then, knob 122 is rotated as described above to rotate screw 132 to adjust the height of spindle 80 relative to the lower, open end of spindle housing 14. Finally, the angular setting of spindle housing 14 relative to motor housing 24 is accomplished and locked by actuating toggle assembly 50 with lever 52 as described above with respect to FIG. 5. The motor is then energized by supplying electrical power to the motor.

The power tool is held by gripping grip 40 and manipulating push button 46 with the index finger of the hand. The power tool is pushed manually over surface 20 on which the power tool is mounted. One of the side faces 30 and 32 of base plate 26 moves against a fence to guide the power tool 10. The cutting tool 22 can either be spaced above surface 20, can be flush with the work surface, or can be below the work surface.

Figure 6:
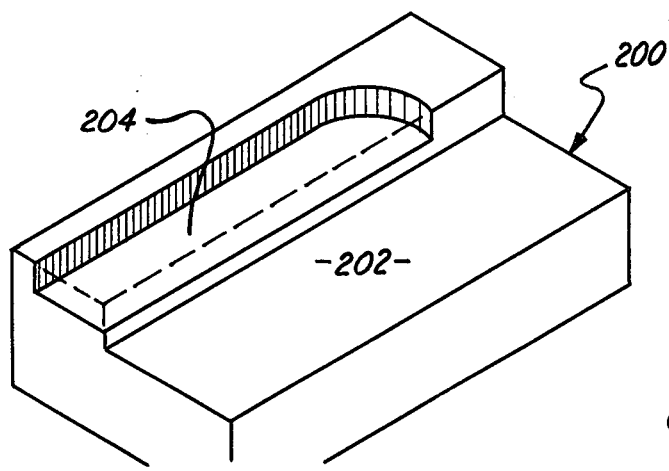
FIGS. 6, 7 and 8 are perspective views of workpieces cut by the power tool of the present invention.

FIG. 6 shows a workpiece 200 having an upper surface 202 which has been routed or cut to form a recess 204 whose bottom is above surface 202. The dashed lines in FIG. 6 represent the material that has been removed by the cutting action of the tool.

Figure 7:
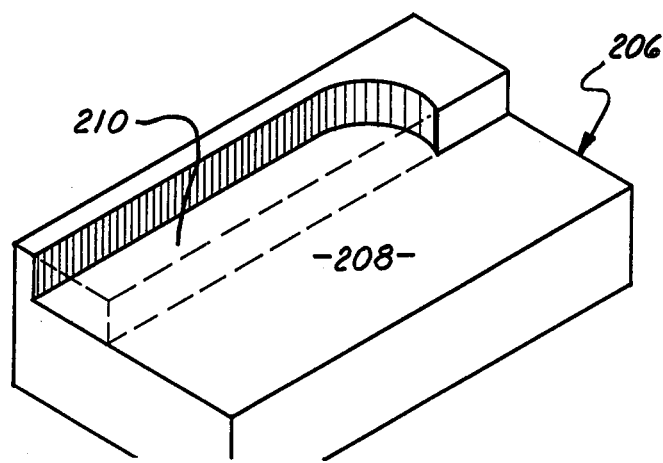

FIG. 7 shows a workpiece 206 having an upper surface 208 and a recess cut by the tool 210 in such a way that the tool is flush with the work surface 208. Thus, the bottom of the recess formed by the cutting action is flush with surface 208.

Figure 8:
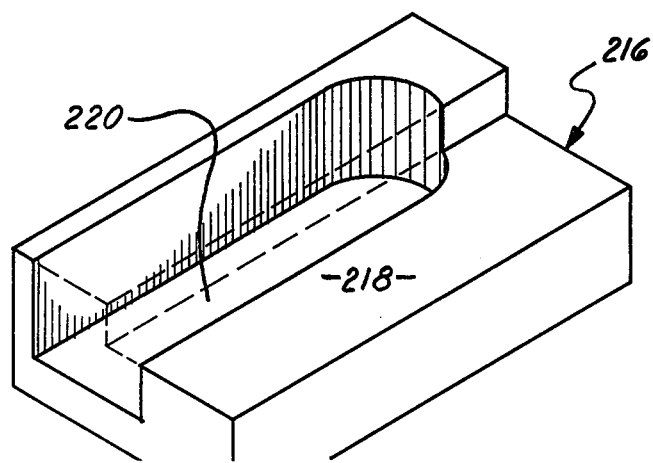

FIG. 8 shows a workpiece 216 having a flat, upper surface 218 and a recess 220 formed by the action of the tool with the bottom of recess 220 being below surface 218, FIG. 8 therefore represents an example of a cut made with cutting tool 20 is set below work surface 20.

The present invention provides a portable, electric-motor-driven power tool which will perform all of the ordinary functions of a conventional router, and also perform the tasks previously accomplished only by the use of an overhead, radial arm router. This tool fills the need for the small woodworking shop as well as the home hobby shop, neither of which can afford the cost of a large, expensive piece of machinery, nor the impracticality of a non-portable tool.

What is claimed is:

1. A power tool comprising: a support; a spindle; first means mounting the spindle on the support for angular movement relative thereto through a predetermined arc into any one of a number of operative positions; means coupled with said spindle mounting means for releasably securing the spindle in any one of said operative positions; second means coupled with the spindle for mounting the same for axial movement relative to the support; a drive shaft rotatably coupled to said spindle; means adjacent to one end of the drive shaft for releasably attaching a tool thereto; a motor carried by the support, said motor having a drive shaft; and means interconnecting the motor drive shaft with the shaft of the spindle for rotating the spindle shaft when the spindle is in any one of said operative positions; and means coupled with the motor for controlling the actuation thereof.

2. A power tool as set forth in claim 1, wherein said second means adjustably mounts the spindle for up and down movement with respect to said support, whereby the tool on its shaft of the spindle can be adjusted in height with reference to a workpiece.

3. A power tool as set forth in claim 1, wherein the first means is operable to permit rotation of the spindle about the motor drive shaft.

4. A power tool as set forth in claim 1, wherein said support includes a base plate having a flat bottom surface and a flat side face, said side face adapted to define a guide for engaging an adjacent structure for guiding the power tool over a support surface.

5. A power tool as set forth in claim 1, wherein said support includes a base plate having a flat bottom surface and a pair of opposed, generally parallel side faces, said flat bottom surface adapted to engage a support surface, said base plate having an extremity adjacent to and spaced from the path of travel of the spindle to allow the cutting tool of the shaft of the spindle to be moved above and below the plane of the bottom surface of the base plate.

6. A power tool as set forth in claim 1, wherein is included means carried by the drive shaft of the spindle for releasably securing a tool thereto.

7. A power tool as set forth in claim 6, wherein said spindle shaft includes a tubular body for receiving an adjustment tool, a collet at one end of the spindle shaft and movable longitudinally of the spindle shaft, and means interconnecting the shaft and the collet and responsive to the rotation of the tool inserted in the shaft body to shift said collet relative to said spindle shaft.

8. A power tool as set forth in claim 7, wherein said spindle shaft includes a first, drive shaft coupled with the motor, and a second, tubular driven shaft telescopically receiving the first shaft, there being means interconnecting the first and second shafts so that the second shaft will rotate upon rotation of the first shaft, said collet being adjacent to one end of the second shaft.

9. A power tool as set forth in claim 8, wherein the second shaft has a conical inner, end surface, said collet having a conical outer surface in mating relationship to the inner conical surface of the second shaft, and key means coupled between the collet and the second shaft for preventing rotation of the collet relative to the driven shaft when a tool is coupled to the interconnecting means for shifting the collet longitudinally of the second shaft upon rotation of the adjustment tool.

10. A power tool as set forth in claim 7, wherein, said first shaft is tubular, the interconnecting means being axially aligned with the interior of said first shaft, and means coupled with the first shaft for holding the same against rotation when the adjustment tool is in the interior of the first shaft.

11. A power tool as set forth in claim 10, wherein said holding means includes a cam member normally across the path of travel of the adjustment and moveable into coupled relationship with the support when the adjustment tool is inserted in the interior of the first shaft.

12. A power tool as set forth in claim 8, wherein the second shaft has a longitudinal slot therethrough, and pin means in the slot for attaching the first and second shafts together so that the shafts rotate as a unit relative to the support.

13. A power tool as set forth in claim 1, wherein said spindle mounting means includes a housing, and including said second means being carried by said housing.

14. A power tool as set forth in claim 13, wherein said adjusting means include a screw in the spindle housing, means mounting the screw for rotation about an axis generally parallel to the path of travel of the spindle in the housing, means interconnecting the screw and the spindle for transferring the rotational movement of the screw to axial movement of the spindle, said screw having means for rotating the same.

15. A power tool as set forth in claim 14, wherein is included a releasable lock coupled with the screw for holding the same against rotation to thereby fix the location of the spindle relative to the spindle housing.

16. A power tool as set forth in claim 15, wherein said lock includes tubular extension within the spindle housing, cam means coupled to the extension for releasably holding the screw from rotating relative to the spindle housing, and means for manually releasing the locking action of the cam means.

17. A power tool as set forth in claim 16, wherein said cam means includes a cam member moveable into frictional engagement with the inner surface of the tubular extension, a stem shiftable longitudinally of said extension and having a projection engageable with the cam member, and spring means biasing the projection against the cam member.

18. A power tool as set forth in claim 1, wherein said spindle securing means includes a toggle mechanism carried by the support.

19. A power tool as set forth in claim 18, wherein said spindle mounting means includes a housing, said toggle mechanism including a linkage for applying a force to a portion of the spindle housing for urging the latter into frictional engagement with a part of the support.

20. A power tool as set forth in claim 19, wherein is included means for adjusting the force exerted on said portion of the spindle housing.

21. A power tool as set forth in claim 20, wherein said force adjusting means includes a screw bearing, said linkage including a pivotal crank having a pivot pin thereon a resilient member between the screw and the pin, said screw being moveable toward and away from the pin to shift the pin with respect to said support.

22. A power tool as set forth in claim 21, wherein said linkage includes a lever pivotally mounted on the support for urging the linkage into bearing relationship to said portion of the spindle housing.

23. A power tool as set forth in claim 22, wherein said support includes a hand grip secured to the base and extending upwardly therefrom, said lever being near the upper end of the hand grip.

24. A power tool for cutting a workpiece comprising: a base plate having a flat bottom surface and at least one, flat, relatively straight side face; a motor housing secured to and extending upwardly from the base plate near one end thereof; a motor in the motor housing, said motor having drive shaft; a spindle housing mounted on the motor housing for rotation through a predetermined arc about the central axis of the motor drive shaft; a spindle in the spindle housing; means mounting the spindle in the spindle housing for up and down movement with respect thereto; means coupled with the spindle for adjusting the height of the spindle with reference to the spindle housing; shaft means rotatable mounted in the spindle for rotating a cutting tool attached to the shaft means, said shaft means having means for releasably attaching a cutting tool thereto; and means releasably securing the spindle housing to the motor housing.

25. A power tool as set forth in claim 24, wherein said spindle housing projects outwardly from the side of the motor housing and beyond said one end of the base plate, whereby the spindle can be moved through a distance sufficient to permit the cutting tool to be above, flush with or below the plane of the bottom flat surface of the base plate.

26. A power tool as set forth in claim 24, wherein said support includes a hand grip, said releasable securing means including a lever near the upper end of the hand grip.

* * * * *